Aug. 11, 1970   A. S. ROBINSON   3,523,778
METHOD AND APPARATUS FOR INJECTING A LAYER OF A DIFFERENT
GLASS INTO A STREAM OF MOLTEN GLASS
Filed Oct. 19, 1967   3 Sheets-Sheet 1
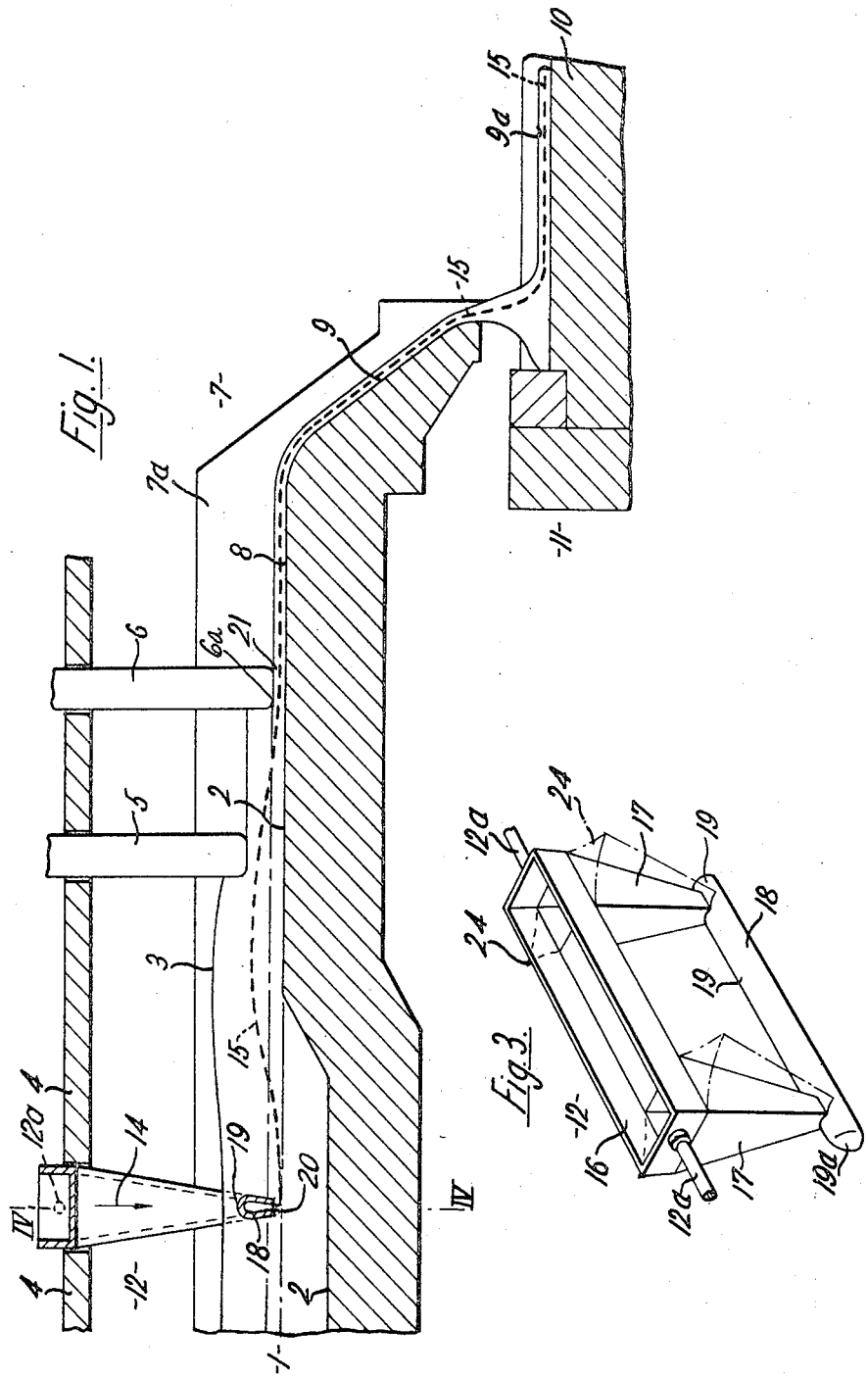
Inventor
Albert Sidney Robinson
By
Morrison, Kennedy & Campbell
Attorneys

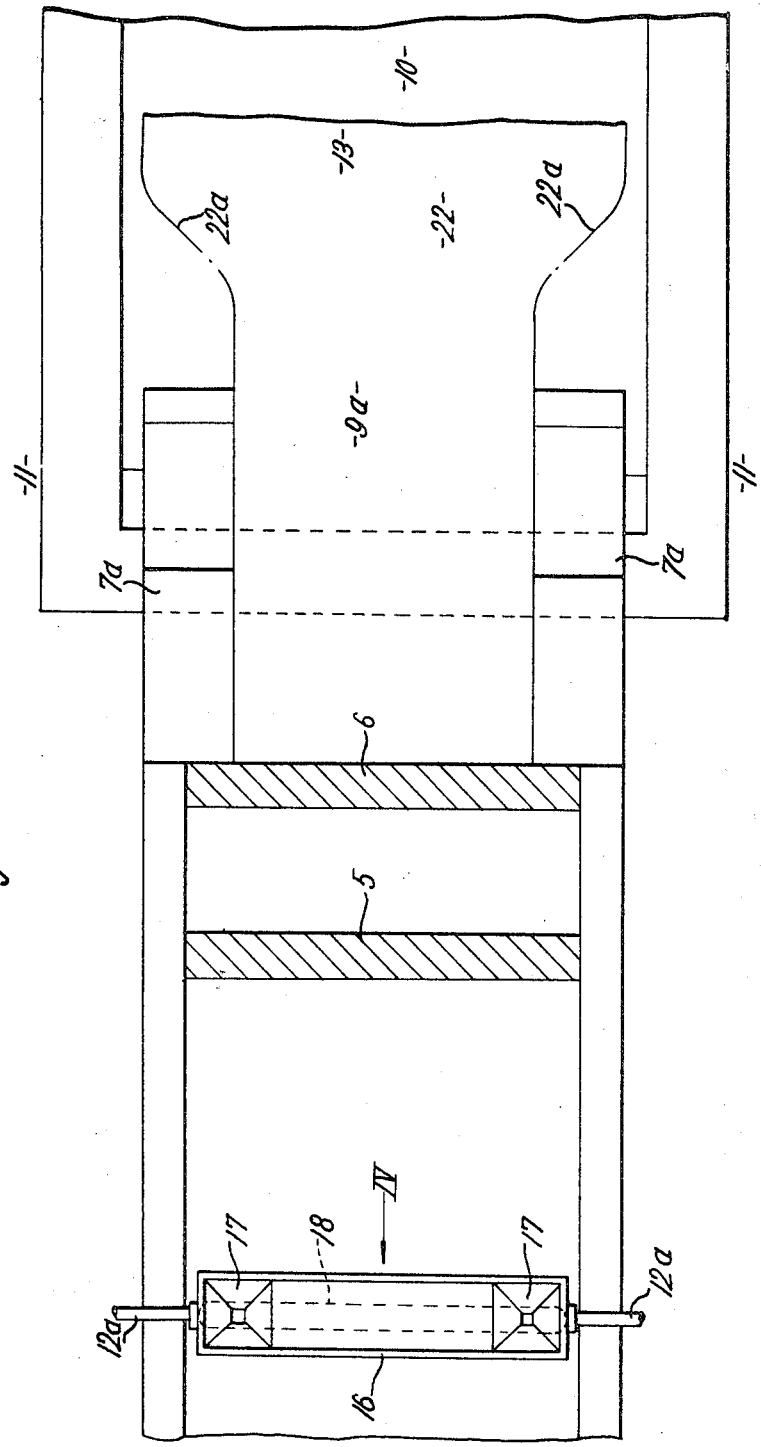

Aug. 11, 1970   A. S. ROBINSON   3,523,778
METHOD AND APPARATUS FOR INJECTING A LAYER OF A DIFFERENT
GLASS INTO A STREAM OF MOLTEN GLASS
Filed Oct. 19, 1967   3 Sheets-Sheet 3
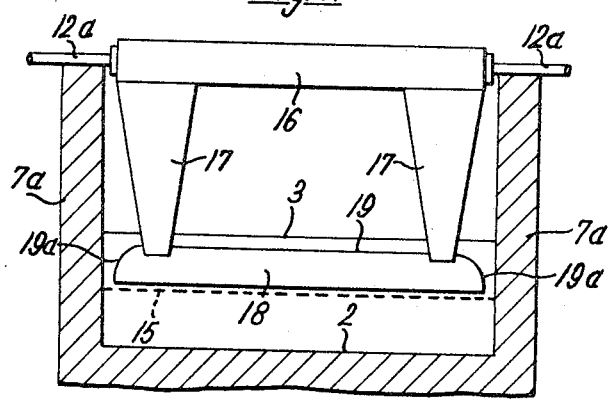
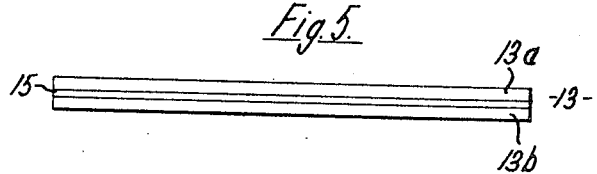
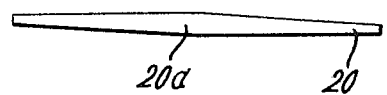
Inventor
Albert Sidney Robinson
By
Morrison, Kennedy & Campbell
Attorneys

United States Patent Office 3,523,778
Patented Aug. 11, 1970

3,523,778
METHOD AND APPARATUS FOR INJECTING A LAYER OF A DIFFERENT GLASS INTO A STREAM OF MOLTEN GLASS
Albert Sidney Robinson, Birkdale, Southport, England, assignor to Pilkington Brothers Limited, Liverpool, England, a corporation of Great Britain
Filed Oct. 19, 1967, Ser. No. 676,507
Claims priority, application Great Britain, Nov. 24, 1966, 52,716/66
Int. Cl. C03b 17/00
U.S. Cl. 65—65
9 Claims

ABSTRACT OF THE DISCLOSURE

A stratified ribbon of glass is developed on a bath of molten metal by pouring molten glass on to the bath, and a thin stratum of a different glass is injected into the molten glass prior to pouring so that the stratified molten glass is directed to the spout over which the stratified glass is poured on to the bath.

BACKGROUND OF THE INVENTION

This invention relates to the manufacture of glass in sheet form whether the final product is flat or bent from the flat form, and has for its main object to devise an improved continuous method of manufacturing the glass in sheet form from molten glass during which manufacture the glass in sheet form is given a desired characteristic by imparting special characteristics to the molten glass from which the glass in sheet form is eventually produced and hereinafter sometimes referred to as a ribbon of glass which ribbon may be flat or bowed.

Glass in ribbon form is sometimes produced by a continuous method of drawing the ribbon from a buoyant body of molten glass established on a bath of molten metal having a higher specific gravity than that of the glass, the buoyant body being maintained by flowing molten glass along a canal leading at floor level to a spout directed longitudinally of the bath, the volume of which flow is regulated near the floor of the canal where the floor merges with the spout.

SUMMARY

In accordance with the present invention the ribbon developed from the buoyant body is of stratified form having at least one stratum of appropriate material incorporated in the ribbon to impart desired special characteristics to the ribbon, and in carrying the invention into effect a novel principle of operation is employed in that the forward laminar flow of the molten glass in the canal is used as the vehicle for carrying each stratum of the said appropriate material into the buoyant body of molten glass established on the bath of molten metal and thereby the buoyant body of molten glass is itself constituted as a stratified body.

The forward laminar flow in the canal extends upstream at levels contained in the height of the discharge opening defined between the lower edge of the regulating tweel and the floor of the canal.

Accordingly the present invention comprises a continuous method of developing a ribbon of glass from a buoyant body of molten glass established on a bath of molten metal by a regulated discharge of molten glass from the floor of a canal on to the floor of a spout to feed the buoyant body, characterised in that the ribbon developed from the buoyant body has at least one characteristic incorporated in it which characteristic does not exist in the molten glass supplied to the canal but is introduced into the molten glass by injecting appropriate material in a thin stratum into the molten glass in the canal at the levels of discharge from the canal towards the spout, directing the molten glass in stratified form to the spout to maintain on the bath of molten metal a stratified buoyant body, developing a stratified ribbon having the desired added characteristic from the buoyant body and stabilising the ribbon.

The injected material is introduced either into the molten glass flowing in the canal across the whole width or substantially so, of the canal, for example when it is desired that the imparted characteristic shall extend over the entire projected area of the ribbon produced, or there may be an intermittent flow considered transversely of the canal when the introduction of the material is for the purpose of imparting a decorative effect, e.g. stripes in the longitudinal direction of the ribbon. However, in other cases the introduction may be from each side of the canal inwardly e.g. in producing glass to be used as toned glass for windscreens of motor cars. By such method of introduction the ultimate ribbon may be divided longitudinally to produce in one length a pair of similarly toned areas of glass intended for cutting and trimmnig the shape as required for glass for windscreens.

The material injected into the molten glass may be a fluorescent glass, that is to say glass containing uranium, thallium and different metallic sulphurs which become fluorescent when they are exposed to ultra-violet light.

Alternatively the material injected into the molten glass flowing in the canal may be a photographic or photochromatic glass e.g. a glass having in its composition some silver salts which change colour on exposure to the sun's rays and return to normal when no longer so exposed, and the expression "coloured glass" used herein is intended to cover a glass which permanently tones or colours the ultimate ribbon or a glass which only automatically imparts colouring in specifically required circumstances as indicated.

Accordingly the present invention comprises the step of injecting a coloured glass in a molten state which coloured glass may be selected either merely for ornamentation or to give the glass a predetermined filter effect, but instead of ornamenting by colouration the ornamentation may be introduced by injecting molten glass having an index of refraction which is different from that on the molten glass flowing along the canal, and the injected glass having a different index of refraction may be itself coloured.

Alternatively the present invention also comprises a method of developing a ribbon of flat glass on a bath of molten metal from the downstream end of a layer of molten glass characterised by injecting coloured molten glass of the same index of refraction as that of the glass in the canal.

From another aspect the present invention comprises a method of developing a ribbon of flat glass on a bath of molten metal from the downstream end of a layer of molten glass, wherein the volume of injected molten glass is gradated across the width of the canal.

The injected molten glass may be similarly gradated in successive predetermined areas across the width of the canal, the extent of the several areas corresponding to the height dimension of the toned zone in a windscreen of the ultimate articles to be produced from the stratified ribbon, e.g. in the production of windscreens there may be five of such areas which will be separated when the ribbon leaves an annealing lehr, each strip thus produced having a width dimension greater than the depth dimension of the windscreen, and each strip being divided into lengths at least accommodating the length dimension of the said windscreen.

The molten glass injected into the canal may have the same index of refraction and be injected to a calculated thickness, said injected glass however having a different coefficient of expansion, the injected glass being introduced transversely of the canal for the full width thereof.

Thus the molten glass injected into the canal may be employed for strengthening the ultimate ribbon, that is to say the injected glass may be a glass which has a relatively high coefficient of expansion so that during cooling, the outer surfaces of the ultimate ribbon being of ordinary glass would be pulled into compression thereby strengthening the ribbon.

Alternatively the central layer may be of a glass composition with the same co-efficient of expansion as the outer glass so that the glass can easily be cut at the lehr end; but if cut pieces for example are reheated, the central glass composition is such that it forms submicroscopic crystals of high co-efficient of expansion so that the cut piece on cooling possesses surface compressive layers.

When the material injected into the glass in the canal is a molten glass experiments have shown that if the glass in the buoyant stratified body of molten glass on the bath is permitted unhindered lateral flow to the limit of its free flow a precise reproduction of the distribution of the glass incorporated in the laminar flow in the canal occurs when the ultimate stratified ribbon is developed from the buoyant body of molten glass.

Accordingly the present invention comprises a method of developing a stratified ribbon from a buoyant body of molten glass maintained on a bath of molten metal characterised in that the ribbon developed from the buoyant body has at least one characteristic incorporated in it which characteristic does not exist in the molten glass supplied to the canal but is introduced into the molten glass by injecting appropriate molten glass in a thin stratum into the molten glass in the canal at the levels of discharge from the canal towards the spout: directing the molten glass in stratified form from the canal towards the spout to maintain on the bath of molten metal a stratified buoyant body, permitting unhindered lateral flow of the molten glass in the buoyant body to reproduce a distribution of the injected molten glass which corresponds to the distribution effected in the canal, developing a stratified ribbon having the desired added characteristic from the stratified buoyant body and stabilising the ribbon.

In one preferred method of operating in accordance with the invention the injected molten glass is introduced transversely of the canal at the levels of discharge to the spout where a laminar flow exists to reside in the forward laminar flow for a sufficient period of time to attain the desired distribution before it reaches the regulating station, and later permitting unhindered lateral flow of the stratified glass in the buoyant body on the bath to produce a distribution of the injected glass corresponding to the distribution effected in the canal, developing the stratified ribbon and withdrawing the ribbon from the bath.

Thus to impart to molten glass flowing in the canal a desired additional characteristic molten glass having the desired additional characteristic, is injected in a thin stratum below the uppermost stratum of the forward laminar flow of molten glass in the canal, flowing molten glass and the injected stratum in stratified form through the regulated discharge to the spout to form on the molten metal a stratified buoyant body, developing a stratified ribbon having the desired added characteristic from the stratified buoyant body, and stabilising the stratified ribbon.

BRIEF DESCRIPTION OF THE DRAWINGS

FIG. 1 is a central sectional elevation along the middle line of the canal leading from the melting tank, illustrating a preferred embodiment of the invention by way of example, FIG. 2 is a plan view of the canal shown in FIG. 1, FIG. 3 is an isometric view of the hopper structure, FIG. 4 is an elevation of the hopper structure viewed in the direction of the arrow IV in FIG. 2.

FIG. 5 is an elevation of a sheet of glass cut from the ultimate ribbon produced from the installation illustrated in FIGS. 1 and 2, and FIG. 6 is a detail view hereinafter referred to.

DESCRIPTION OF THE PREFERRED EMBODIMENT

Referring to the drawings the canal extension from a melting tank, not shown, is generally indicated at 1, the floor of which canal is indicated at 2. The surface level of the molten glass flowing along the melting tank is indicated at 3. Depending through the roof refractories 4 overlying the canal are two tweels 5 and 6. Tweel 5 assists in preventing furnace gases reaching the second tweel 6.

The tweel 6 is a regulating tweel and determines the rate of flow of molten glass along the floor of the canal on its way to channelling located for feeding the molten glass on to the bath. This regulating tweel is sometimes referred to as a "gate."

The channelling is preferably in the form of a spout, generally indicated at 7, which spout comprises side walls 7a, one only of which is shown, a floor 8 which, in the construction shown, merges with the floor 2 of the canal and a steeply inclined floor 9 merging with the floor part 8; thus the molten glass flowing along the canal is held back by the tweel 6 and there is a regulated flow through a "throat" under the tweel 6, i.e. the discharge opening defined between the tweel 6 and the floor 2 of the canal to the merging floor 8 of the spout. Then the glass flow is down the floor 9 of the spout, after which the advancing glass arrives on a bath 10 of molten metal contained in a tank structure generally indicated at 11 said bath having a higher specific gravity than that of the molten glass so that the molten glass becomes buoyantly supported on the bath. The bath is preferably formed of molten tin or an alloy of tin in which the tin predominates.

In the canal a hopper structure generally indicated at 12 depends from the refractories 4 in spaced relation with the regulating tweel 6 i.e., lengthwise along the canal and the hopper holds the selected fluid material having additional characteristics which it is desired to impart to the ribbon of glass produced on the bath of molten metal. The ribbon so produced is indicated at 13.

In the embodiment being described the glass flowing along the canal up to the hopper 12 is conventional soda lime glass, and in the particular embodiment described the objective is to so modify the glass passing along the canal from the hopper as to give it the appearance of coloured glass. The objective may be either to merely produce the appearance of coloured glass or to impart to the ultimate ribbon 13 a predetermined colour filter value. To this end molten coloured glass is fed into the hopper structure 12 and the coloured molten glass leaving the hopper structure 12 is subjected to a static pressure in the direction indicated by the arrow 14 and this pressure is related to the pressure existing in the forward laminar flow at the level of injection. Thus a thin stratum of the molten glass from the hopper is obtained, as indicated in FIGS. 1 and 4 of the drawings by the flow line 15.

Molten glass is fed into the receiver 16 from which depends two similar hoppers 17 which discharge the molten glass into a chamber 18, the roof 19 of which is fully submerged in the molten glass flowing along the canal. The chamber comprises a mouth 20 (see FIG. 1) which extends for the full length of the chamber.

In the construction shown the level of the mouth 20 is about half way between the level of the lower edge 6a of the tweel 6 and the floor 2 of the canal and it will be appreciated that in carrying out the present invention the whole length of the mouth 20 is at a level which is below the defining lower edge 6a of the tweel 6 which with the floor 2 forms the discharge opening 21 for the canal.

By selection of the degree of immersion of the mouth 20 of the hopper structure 12 in the forward flowing molten glass in the canal at a level between the upper and lower defining limits of the discharge opening 21 and by a selection of pressure on the molten glass in the hopper related to the pressure in the ambient glass near the floor 2 of the canal and passing through the discharge opening 21, between the bottom edge of the tweel 6 and the floor 2 on the upstream side, i.e. the supply side thereof, a progressive forward flow is achieved as indicated in the drawings due to the forward laminar flow at the through levels. Thereby there are established strata of laminar flow through the throat 21 so that the molten glass injected below the uppermost strata becomes incorporated in the laminar flow and is carried by the laminar flow through the throat 21.

The laminar flow persists not only during the passage of the molten glass under the regulating tweel 6, but also on the floor part 8 of the spout as well as on the steeply inclined floor 9 thereof and eventually arrives in ribbon form 9a on the bath 10 of molten metal where the forward flow is in ribbon form moving in the same direction as the general flow along the canal, and relatively thick as compared with the thickness of the ultimate ribbon developed from the buoyant body of molten glass established on the bath and fed with molten glass in compensation for glass taken from the buoyant body as the ultimate ribbon is developed therefrom.

The thermal conditions existing over the bath of molten metal 10 are such as to ensure an unhindered lateral flow of the molten glass delivered on to the bath and this unhindered lateral flow to the limit of its free flow, ensures a distribution of the injected glass corresponding to the distribution determined by the form of the mouth 20 of the hopper structure 12.

The ultimate stratified ribbon indicated at 13, is developed from the buoyant body of molten glass the persisting form of which buoyant body is generally indicated at 22 (see FIG. 2). The trapezoidal shape of the buoyant body 22, on the bath of molten metal 10 is maintained by the continuous regulation of the feed of molten glass passing under the tweel 6. The lateral flow, which occurs on the bath of molten metal, is indicated by the chain lines 22a and it is where the unhindered lateral flow has ceased that the ultimate ribbon 13 is developed by a drawing operation.

Further where the injected material is molten glass it may be injected at a temperature less than that of the glass in the forward flowing laminar flow, and an advantage in so doing is that the injected glass will have a higher viscosity than the ambient glass in the laminar flow and the difference in viscosities will prevent any diffusion of the injected glass during the several stages of manufacture of the stratified ribbon.

A feature of the hopper structure shown in the drawings is that the chamber 18 is completely submerged in the molten glass flowing along the canal so that molton glass flows over the chamber as well as under it, and to avoid any significant disturbance of the laminar flow, each of the hoppers may have an external flow line construction indicated by chain lines 24 fore and aft of the hopper 17. In addition, the upper walls 19a at the ends of the chamber, that is outside the hopper 17, may be of arcuate formation, widening from the bottom of the hopper towards the end of the mouth 20.

The side walls 7a of the spout 7 may be heated to prevent loss of heat by radiation from the molten glass passing over the spout.

In the arrangement shown the mouth 20 of the hopper structure is a continuous thin slot but the hopper structure may be formed in the nature of a conventional bushing as used in the production of glass fibers so as to discharge a plurality of individual streams for the purpose of introducing into the molten glass stripes of an ornamenting material and the bushing structure may be provided with conventional nipples, through which is forced molten glass held in the bushing structure, so as to ornament the glass with filaments of the glass contained in the hopper.

The continuous supply from a bushing structure may be achieved in known manner wherein molten glass is obtained by a process of melting cullet of the appropriate glass of suitable composition or continually feeding marbles to the bushing.

By installing a plant of the kind described and illustrated in FIGS. 1 to 4 of the drawings a continuous thin and uniform stratum of coloured glass can be incorporated in the ultimate stratified ribbon. The stratum of coloured glass lies parallel to the surfaces 13a, 13b of the ribbon of glass produced and extends across the ribbon. The colour strata is of extraordinary uniform thickness, as illustrated in FIG. 5 of the drawings. Identical results can be obtained by using the control derived from the laminar flow when other characteristics than colour or filter values are imparted to the glass as herein already mentioned.

As shown in FIG. 5 the ultimate stratified ribbon of glass 13 comprises parallel surfaces 13a and 13b and in the middle area there is a thin stratum 15 which stratum imparts to the strata of the parent glass a characteristic which is not obtainable from the molten glass fed into the canal until the injected glass arrives in the laminar flow approaching the regulating tweel 6.

From the foregoing description it will be appreciated that the present invention comprises the apparatus described for producing a stratified ribbon including a hopper structure of which the mouth is located in the canal in relation to the floor of the canal and to the profile of the submerged lower edge of the tweel 6.

Accordingly the present invention comprises apparatus for producing a stratified ribbon of glass characterised by a canal, a spout, and a bath of molten metal said canal having a regulatable discharge opening leading to the spout and said spout being disposed longitudinally of and in the middle area of the bath of molten metal, a hopper mounted on the canal depending into the canal to locate the level of the mouth of the hopper at a level between the upper and lower defining limits of the said discharge opening.

To compensate for differences in velocity across the width of the canal, since generally speaking the flow in the centre is faster than in the marginal areas the mouth of the hopper may be designed so that the volume discharged at the central area is greater than that near the canal walls. It will be appreciated that where a higher velocity flow exists in the canal there is a tendency to produce a thinner effect, e.g. of colour, and that by enlarging the central area of the mouth a compensating increase of supply obtains. Such an enlargement in the mouth is diagrammatically indicated at 20a in FIG. 6. However, where it is desired to obtain a central thin injection as compared with thicker marginal injections parallel walls to the mouth 16 of the hopper may be desirable.

The hopper 12 is, in the construction shown, supported by the roof refractories 4 by fitting the hopper in an opening in the refractories, and a support 12a carried by the hopper may rest on the ends of the refractories to suspend the hopper in the canal to locate the mouth 20 at the desired depth.

By angularly setting the support 12a by locking means, e.g. worm and worm wheel mechanism (not shown) the projected area of the mouth 20 can be adjusted and the entraining effect of the ambient laminar flow modified.

To engender the desired linear flow of the injected glass 15 within the levels of discharge to the spout 7, a shield, not shown, may depend from the downstream wall of the bushing so as to provide ancillary means of directing the desired forward flow of injected material to assist the work of the unidirectional forward flow in the parent molten glass. The shield may be in nature a platinum baffle secured to the forward wall of the hopper 12 and having a profile corresponding to the flow line of the projected glass as it travels forwardly from the mouth of the hopper towards the regulating tweel 6.

The stratified mobile laminar mass advancing along the canal is compacted by the local forces in the glass approaching and flowing under the gate 6 and this effect is the same whether the injected material is either in particulate form, e.g. spangles or a viscous liquid such as molten glass. A stratified thermally homogeneous glass may flow to the spout, comprising a relatively thin stratum of injected material, and if molten glass is injected it is welded together with the parent body fed to the canal in such intimate relation that however the ultimate ribbon is cut a monolithic element is obtained. Accordingly the present invention also comprises the stratified product of a method of developing a ribbon of glass into which characteristics have been imparted as hereinbefore described.

I claim:

1. A method of producing a stratified ribbon of glass, comprising flowing molten glass from the floor of a canal on to the floor of a spout, regulating the flow of molten glass from the canal to the spout as a laminar flow, injecting modifying molten glass in a thin stratum into the molten glass in the canal at the level of discharge from the canal towards the spout, graduating the volume flow of injected molten glass across the width of the canal to graduate the thickness of said thin stratum across the stratified glass, directing the stratified laminar flow of molten glass from the spout on to a bath of molten metal to establish on the bath a stratified buoyant body of molten glass, developing from the buoyant body an advancing stratified ribbon having an added characteristic produced by the modifying molten glass graduated across its width, and stabilising the stratified ribbon.

2. A method of producing a stratified ribbon of glass, comprising flowing molten glass from the floor of a canal onto the floor of a spout, regulating the flow of molten glass from the canal to the spout as a laminar flow, defining the upper level of glass flow through the spout and maintaining the glass flowing through the canal at a higher level, dividing the flow of glass through the canal at a region upstream of the spout into overlying and underlying strata, injecting modifying material in a thin stratum into the molten glass in the canal between said overlying and underlying strata in a manner not substantially to disturb laminar flow of all said strata toward said spout, directing the stratified laminar flow of molten glass from the spout onto a bath of molten metal to establish on the bath a stratified buoyant body of molten glass, developing from the buoyant body an advancing stratified ribbon, and stabilizing the stratified ribbon.

3. Apparatus for producing a stratified ribbon of glass comprising a bath of molten metal on which a ribbon of glass is formed, a canal for molten glass flowing to the molten bath and an intermediate spout disposed longitudinally of and in the middle area of the bath of molten metal through which glass from the canal flows to the bath, a discharge opening between the canal and the spout located below the normal level of the glass in the canal and having upper and lower defining limits for regulating the flow of glass from the canal to the spout as a laminar flow, means inserted in the canal upstream of the discharge opening for dividing said flow into an overlying flow portion above and an underlying flow portion below said inserted means, and means for introducing a stratum of modifying material between said overlying and underlying flow portions in the region of said inserted means and under conditions creating no substantial disturbance of said laminar flow toward said discharge opening.

4. Apparatus according to claim 3 wherein the stratum of modifying material is introduced at a level between the upper and lower defining limits of the discharge opening.

5. A method according to claim 2 wherein the modifying material injected into the molten glass in the canal is a thin stratum of coloured glass in a molten state which coloured glass is selected from glasses having ornamentation and glasses giving a predetermined filter effect.

6. A method according to claim 2 wherein the modifying material injected into the molten glass in the canal is a thin stratum of molten glass having an index of refraction which is different from that of the molten glass flowing along the canal.

7. A method according to claim 2 wherein the modifying material injected into the molten glass in the canal is a thin stratum of coloured glass in a molten state and having the same index of refraction as that of the glass in the canal.

8. A method according to claim 2, wherein the modifying material injected into the molten material in the canal is molten glass of the same index of refraction as that of the glass in the canal but of a different coefficient of expansion, said injected glass being introduced transversely of the canal for the full width thereof.

9. A method according to claim 2, wherein the modifying material injected into the molten glass in the canal is a glass which has a relatively high coefficient of expansion as compared with the outer glass so that during cooling, the outer surfaces of the ultimate ribbon are pulled into compression thereby strengthening the glass.

References Cited
UNITED STATES PATENTS

| | | | |
|---|---|---|---|
| 1,529,947 | 3/1925 | Freese | 65—121 |
| 2,244,468 | 6/1941 | Lytle | 65—145 |
| 3,305,338 | 2/1967 | Robinson | 65—182 |
| 3,218,143 | 11/1965 | De Lajarte | 65—182 X |

ARTHUR D. KELLOGG, Primary Examiner

U.S. Cl. X.R.

65—99, 121, 145, 146, 335